(12) United States Patent
Donofrio et al.

(10) Patent No.: US 7,572,202 B2
(45) Date of Patent: Aug. 11, 2009

(54) ELECTRONIC LOCKING DIFFERENTIAL WITH DIRECT LOCKING STATE DETECTION SYSTEM

(75) Inventors: Gregory M Donofrio, Clinton Township, MI (US); Jeffrey A Goolsby, Clinton Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 275 days.

(21) Appl. No.: 11/700,564

(22) Filed: Jan. 31, 2007

(65) Prior Publication Data

US 2008/0182702 A1    Jul. 31, 2008

(51) Int. Cl.
*F16H 48/20* (2006.01)
(52) U.S. Cl. ............... 475/235; 475/233; 192/84.92
(58) Field of Classification Search .......... 475/149, 475/150, 230, 231, 233, 235, 236; 192/48.91, 192/48.9, 48.8, 84.92
See application file for complete search history.

(56) References Cited

U.S. PATENT DOCUMENTS

| | | | |
|---|---|---|---|
| 3,133,454 A | 5/1964 | Padlo | |
| 3,414,100 A | 12/1968 | Spencer | |
| 3,732,752 A | 5/1973 | Louckes et al. | |
| 3,789,876 A | 2/1974 | Kempton et al. | |
| 3,949,841 A | 4/1976 | Jovick et al. | |
| 4,090,592 A | 5/1978 | Jovick et al. | |
| 4,263,824 A | 4/1981 | Mueller | |
| 4,321,946 A | 3/1982 | Paulos et al. | |
| 4,662,499 A | 5/1987 | Jordan | |
| 4,781,078 A | 11/1988 | Blessing et al. | |
| 4,805,486 A | 2/1989 | Hagiwara et al. | |
| 4,864,231 A | 9/1989 | Okumura et al. | |
| 4,955,853 A | 9/1990 | Bausch | |
| 5,019,021 A | 5/1991 | Janson | |
| 5,030,181 A | 7/1991 | Keller | |
| 5,092,825 A | 3/1992 | Goscenski, Jr. et al. | |
| 5,098,360 A | 3/1992 | Hirota | |
| 5,157,966 A | 10/1992 | Lugosi et al. | |
| 5,308,171 A | 5/1994 | Sakamoto | |
| 5,313,161 A | 5/1994 | Miyazawa et al. | |
| 5,350,340 A | 9/1994 | Paul et al. | |
| 5,366,421 A | 11/1994 | Hirota | |
| 5,451,868 A | 9/1995 | Lock | |
| 5,486,757 A | 1/1996 | Easley | |
| 5,523,684 A | 6/1996 | Zimmermann | |
| 5,593,132 A | 1/1997 | Hrytzak | |

(Continued)

FOREIGN PATENT DOCUMENTS

DE    8633084 U1    5/1987

(Continued)

OTHER PUBLICATIONS

U.S. Appl. No. 11/583,688, filed Oct. 2006, DeGowske.

*Primary Examiner*—David D. Le
(74) *Attorney, Agent, or Firm*—Harness, Dickey & Pierce, P.L.C.

(57) ABSTRACT

An axle assembly with an electronic locking differential that employs a locking mechanism having components that are fixed to one another along an axis such that they co-translate with one another when the actuator that effects the locking and unlocking of the differential is operated. A method for assembling a differential is also provided.

20 Claims, 6 Drawing Sheets

U.S. PATENT DOCUMENTS

| | | | |
|---|---|---|---|
| 5,637,049 A | 6/1997 | Zentmyer et al. |
| 5,682,097 A | 10/1997 | Bryant et al. |
| 5,759,126 A | 6/1998 | Zentmyer et al. |
| 5,759,129 A | 6/1998 | Zentmyer et al. |
| 5,816,971 A | 10/1998 | Zentmyer et al. |
| 5,867,092 A | 2/1999 | Vogt |
| 5,911,643 A | 6/1999 | Godlew et al. |
| 5,942,892 A | 8/1999 | Li |
| 5,951,431 A | 9/1999 | Downs et al. |
| 5,984,823 A | 11/1999 | Gage |
| 5,989,147 A | 11/1999 | Forrest et al. |
| 5,998,988 A | 12/1999 | Dickmeyer et al. |
| 6,013,004 A | 1/2000 | Gage et al. |
| 6,038,506 A | 3/2000 | Dickhans et al. |
| 6,083,134 A | 7/2000 | Godlew |
| 6,133,729 A | 10/2000 | Mierzwinski |
| 6,203,464 B1 | 3/2001 | Ishikawa et al. |
| 6,283,884 B1 | 9/2001 | El-Kassouf |
| 6,309,321 B1 | 10/2001 | Valente |
| 6,334,832 B1 | 1/2002 | Heravi et al. |
| 6,398,689 B1 | 6/2002 | Morse et al. |
| 6,428,441 B1 | 8/2002 | Hunt |
| 6,436,002 B1 | 8/2002 | Ishikawa et al. |
| 6,450,914 B1 | 9/2002 | Irwin et al. |
| 6,454,068 B2 | 9/2002 | Arai et al. |
| 6,460,677 B1 | 10/2002 | Roscoe |
| 6,470,988 B1 | 10/2002 | Beesley |
| 6,478,708 B2 | 11/2002 | Krisher |
| 6,488,606 B1 | 12/2002 | Young et al. |
| 6,503,167 B1 | 1/2003 | Sturm |
| 6,527,664 B2 | 3/2003 | Hunt |
| 6,533,697 B2 | 3/2003 | Morse et al. |
| 6,537,979 B1 | 3/2003 | Kuo et al. |
| 6,551,209 B2 | 4/2003 | Cheadle et al. |
| 6,719,662 B2 | 4/2004 | Forrest et al. |
| 6,802,793 B2 | 10/2004 | Zink et al. |
| 6,871,961 B2 | 3/2005 | Balu et al. |
| 6,945,895 B2 | 9/2005 | Fusegi et al. |
| 6,958,030 B2 | 10/2005 | DeGowske |
| 7,017,723 B2 | 3/2006 | Yasui et al. |
| 7,022,040 B2 | 4/2006 | DeGowske et al. |
| 7,137,921 B2 | 11/2006 | DeGowske |
| 7,211,020 B2 | 5/2007 | Gohl et al. |
| 7,384,359 B2 | 6/2008 | Pinkos |
| 7,425,185 B2 * | 9/2008 | Donofrio et al. | 475/231 |
| 2002/0032096 A1 | 3/2002 | Gassmann |
| 2002/0198076 A1 * | 12/2002 | Bryson et al. | 475/231 |
| 2004/0132572 A1 | 7/2004 | Ludwig et al. |
| 2005/0103557 A1 | 5/2005 | Duncan |
| 2005/0187063 A1 | 8/2005 | Haruki |
| 2005/0250613 A1 | 11/2005 | Ludwig et al. |
| 2005/0279607 A1 | 12/2005 | Fusegi |
| 2006/0270508 A1 | 11/2006 | Gohl et al. |
| 2006/0270509 A1 | 11/2006 | Pinkos |
| 2006/0270512 A1 * | 11/2006 | Pinkos | 475/231 |
| 2008/0042791 A1 | 2/2008 | York et al. |
| 2009/0011889 A1 | 1/2009 | Haske et al. |

FOREIGN PATENT DOCUMENTS

| | | |
|---|---|---|
| EP | 1 435 479 A2 | 7/2004 |
| JP | 2001107983 | 4/2001 |
| JP | 2001193821 | 7/2001 |

* cited by examiner

ELECTRONIC LOCKING DIFFERENTIAL WITH DIRECT LOCKING STATE DETECTION SYSTEM

The present disclosure generally relates to axle assemblies and more particularly to an axle assembly having an electronic locking differential.

Commonly owned U.S. Pat. No. 6,958,030 discloses an electromagnetic locking differential assembly that employs an electromagnetic actuator to selectively couple a side gear to a differential case to cause the differential assembly to operate in a fully locked condition. More specifically, the electromagnetic actuator is actuated to axially translate an actuating ring (which is non-rotatably coupled to the differential case) such that dogs on the actuating ring matingly engage dogs that are formed on a face of the side gear opposite the gear teeth. While such electronic locking differentials are fit for their intended purposes, they are nonetheless susceptible to improvement.

SUMMARY

In one form, the present teachings provide an axle assembly that includes an axle housing, a pair of axle shafts and a differential assembly. The differential assembly includes a differential case, a ring gear, an input pinion, a gear set and a locking device. The differential case is rotatably mounted within the axle housing. The differential case includes a mounting hub and an annular pocket. The ring gear is coupled to the differential case for rotation therewith. The input pinion is rotatably mounted in the axle housing and meshingly engaged to the ring gear. The gear set includes first and second side gears and a plurality of pinion gears. The first side gear is proximate a first end of the differential case and is coupled for rotation with a first one of the axle shafts. The second side gear is proximate a second end of the differential case opposite the first end and coupled for rotation with a second one of the axle shafts. The pinion gears meshingly engage the first and second side gears. The locking device includes a first dog, a second dog, a return spring, a thrust member, and an actuator. The first dog includes a plurality of teeth and is non-rotatably coupled to the second side gear. The second dog includes a plurality of mating teeth and is non-rotatably but axially slidably engaged to the differential case. The return spring biases at least one of the first and second dogs in a direction so that the teeth and the mating teeth are not engaged to one another. The thrust member extends through the mounting hub. The actuator is mounted on the mounting hub and has a plunger. The actuator is operable in a returned position, which permits the return spring to maintain the teeth and the mating teeth in a de-coupled condition, and an extended position in which the actuator moves the plunger to push the thrust member and the second dog toward the first dog such that the teeth and the mating teeth engage one another to thereby inhibit relative rotation between the second side gear and the differential case. The plunger, the thrust member and the second dog are fixedly coupled to one another.

In another form, the present teachings provide a method for assembling a locking differential. The method includes: providing a differential case; mounting a first dog ring in the differential case for rotation about an axis; fixedly engaging a spacer to a second dog ring; mounting the second dog ring and the spacer in the differential case, the second dog ring being non-rotatable and axially slidable relative to the differential case; mounting a thrust plate to the differential case, the thrust plate having a leg member; fixedly engaging the thrust plate to at least one of the spacer and the second dog; and mounting an actuator on the differential case, the actuator being extendable to push the thrust plate to drive the second dog ring into engagement with the first dog ring to thereby inhibit relative rotation between the first and second dog rings.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
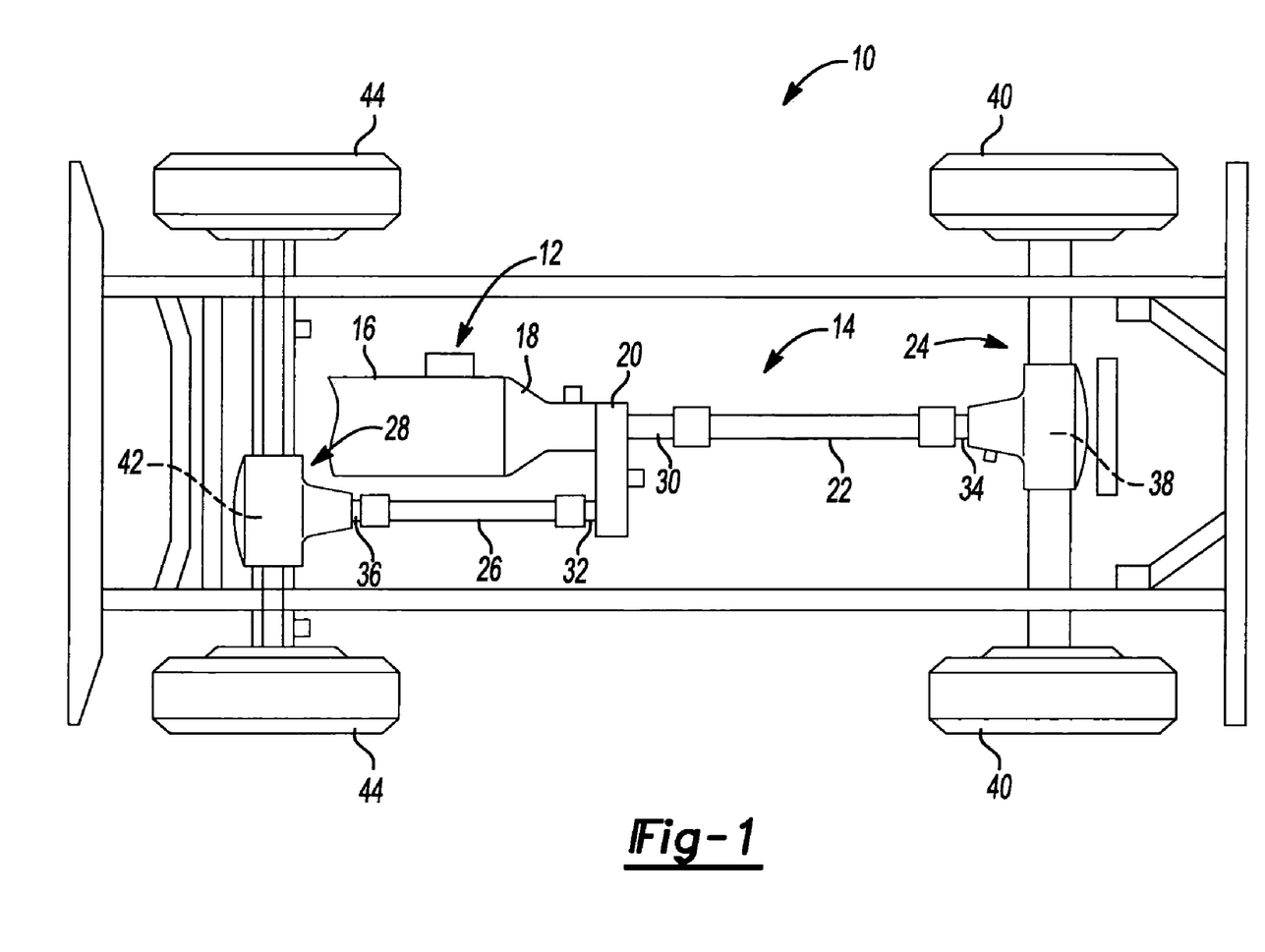
FIG. 1 is a schematic illustration of a vehicle having a driveline constructed in accordance with the teachings of the present disclosure.

With reference to FIG. 1 of the drawings, an exemplary vehicle 10 is schematically shown and can include a power train 12 and a drive train 14. The power train 12 can include a power source, such as an internal combustion engine 16 and a transmission 18 that can receive rotary power from the engine 16 and output power to the drive train 14. The drive train 14 can include a transfer case 20, a rear propeller shaft 22, a rear axle assembly 24, a front propeller shaft 26 and a front axle assembly 28. The transfer case 20 can be employed to transmit drive torque from the transmission 18 to the rear and front axle assemblies 24 and 28. The transfer case 20 can include an input shaft (not specifically shown), which can be coupled to the transmission 18 to receive rotary power therefrom, a rear output shaft 30, which can be coupled to the rear propeller shaft 22, and a front output shaft 32 that can be coupled to the front propeller shaft 26. The rear propeller shaft 22 can transmit rotary power from the rear output shaft 30 to an input pinion 34 of the rear axle assembly 24. The front propeller shaft 26 can transmit rotary power from the front output shaft 32 to an input pinion 36 of the front axle assembly 28. The rear axle assembly 24 can include a differential assembly 38 that can be driven by the input pinion 34 and can output rotary power to drive a pair of rear vehicle wheels 40. Similarly, the front axle assembly 28 can include a differential assembly 42 that can be driven by the input pinion 36 and can output rotary power to drive a pair of front vehicle wheels 42.

The front and rear axle assemblies 24 and 28 can be similar in their construction and operation and as such, only the rear axle assembly 24 will be discussed in detail herein. With additional reference to FIG. 2, the rear axle assembly 24 can include an axle housing 50, a differential assembly 38 and a pair of axle shafts 54 (only one of which is specifically shown). The axle housing 50 can be conventionally configured and can include a housing structure 60 and a pair of bearing caps 62 that can be fixedly but removably coupled to the housing structure 60. The housing structure 60 can define a differential cavity 64 that houses the differential assembly 38. The bearing caps 62 can be decoupled from the housing structure 60 to permit the differential assembly 38 to be received within the differential cavity 64. The axle shafts 54 can be coupled to opposite sides of the differential assembly 38 and to respective ones of the rear vehicle wheels 40 (FIG. 1) in any appropriate manner.

Figure 2:
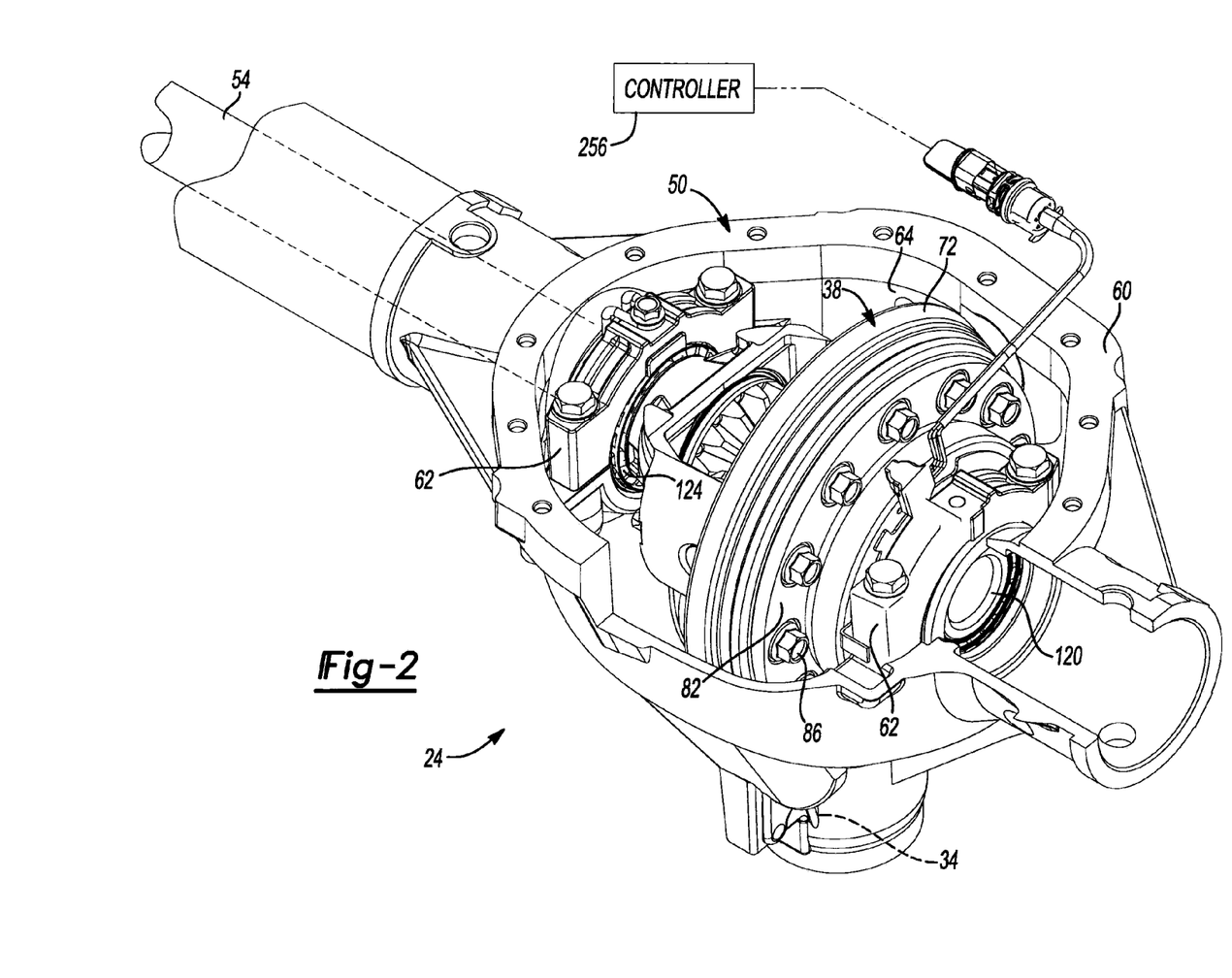
FIG. 2 is a partially broken away perspective view of a portion of the vehicle of FIG. 1, illustrating the rear axle assembly in more detail.
Figure 3:
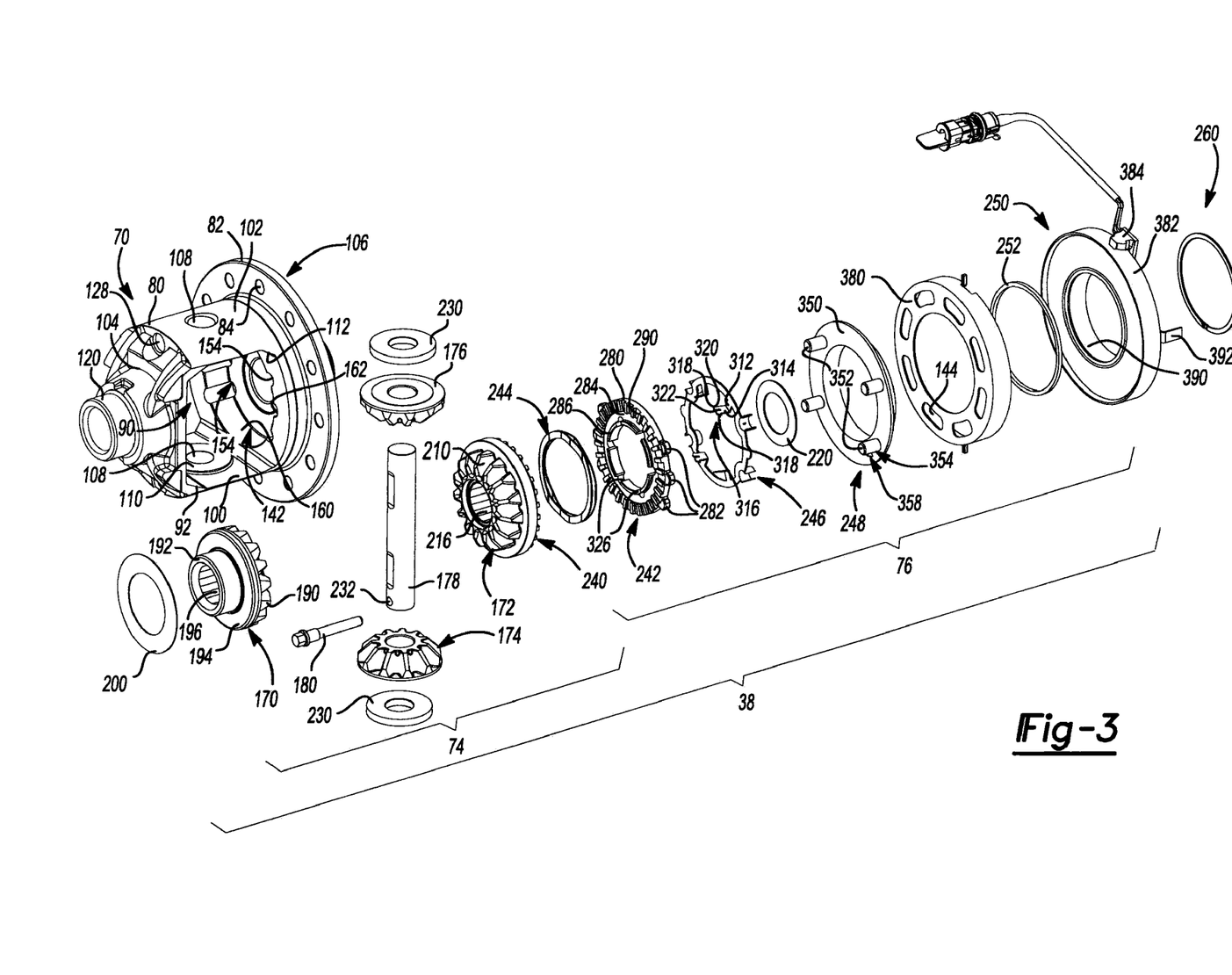
FIG. 3 is an exploded perspective view of a portion of the rear axle assembly, illustrating the differential assembly in more detail.
Figure 4:
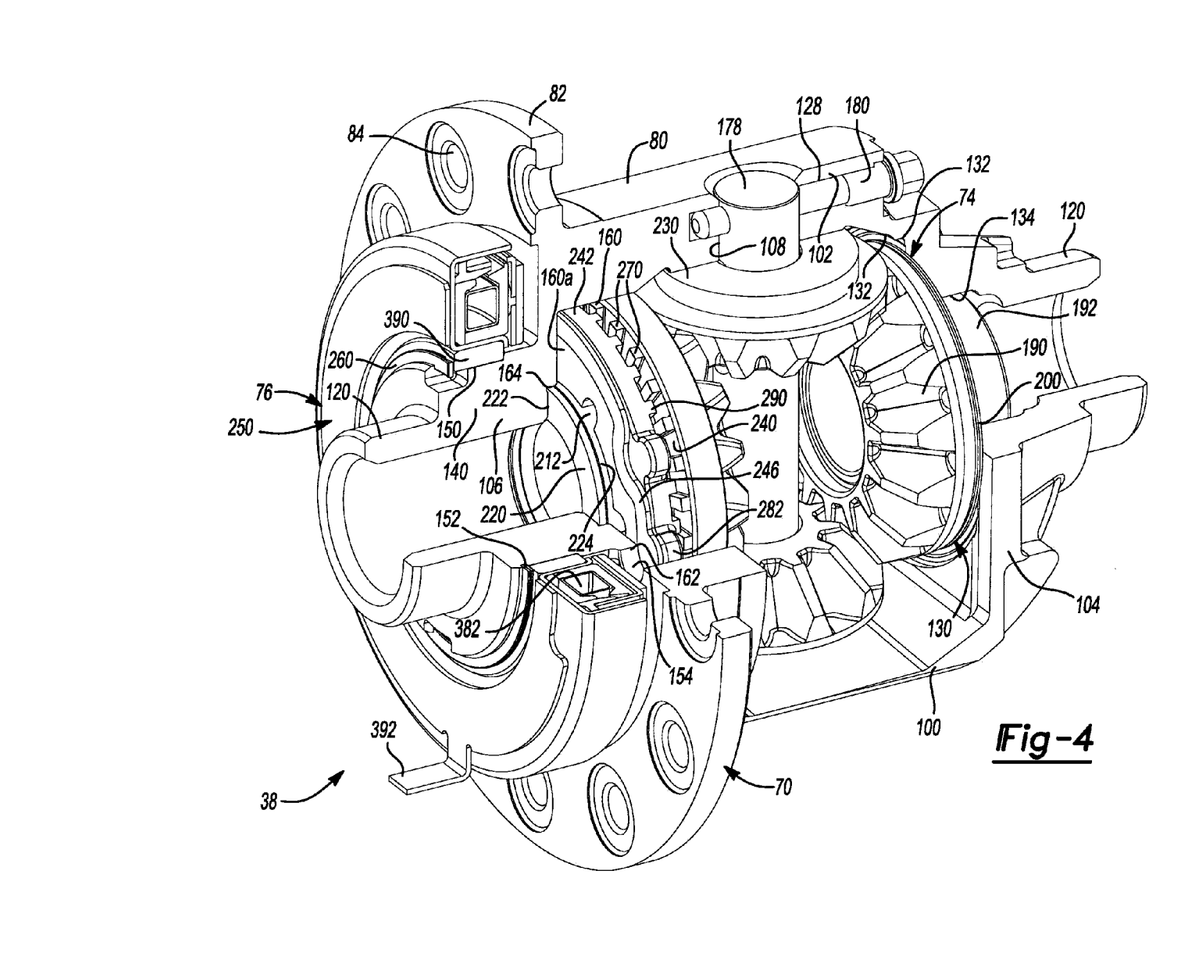
FIG. 4 is a partially broken away perspective view of the differential assembly.

With additional reference to FIGS. 3 and 4, the differential assembly 38 can include a differential case 70, a ring gear 72 (FIG. 2), a gear set 74, a locking system 76 and the input pinion 34 (FIG. 2). The input pinion 34 and the ring gear 72 can be conventionally constructed and mounted in the axle housing 50 and as such, need not be discussed in significant detail herein. Briefly, the input pinion 34 can be coupled to the axle housing 50 via a set of bearings (not specifically shown) and disposed about a rotational axis that is generally perpendicular to a rotational axis of the differential case 70. The input pinion 34 can include a plurality of pinion teeth (not shown) that can be meshingly engaged to a plurality of ring gear teeth (not specifically shown) formed on the ring gear 72.

The differential case 70 can include a body portion 80 and a circumferentially-extending flange 82 that is coupled to (e.g., integrally formed with) the body portion 80. The flange 82 can include a plurality of apertures 84 that can facilitate the removable coupling of the ring gear 72 via a plurality of threaded fasteners 86.

The body portion 80 can define a gear set cavity 90 and one or more assembly windows 92, which can be employed to install the gear set 74 into the gear set cavity 90. In the example provided, the body portion 80 includes first and second side segments 100 and 102, respectively, and first and second end segments 104 and 106, respectively. Each of the first and second side segments 100 and 102 can include a through-bore 108, which can be arranged generally perpendicular to the rotational axis of the differential case 70, and a boss 110 that can be disposed concentrically about the through-bore 108 within the gear set cavity 90. A relatively large fillet radius 112 can be employed at the intersection between the second end segments and the first and second side segments 100 and 102.

Each of the first and second end segments 104 and 106 can span between the first and second side segments 100 and 102 and can include a hollow, axially extending trunnion 120. Each trunnion 120 can define an inside diameter, which can be sized to receive a corresponding one of the axle shafts 54 there through, and an outside diameter that can be sized to engage a bearing 124 (FIG. 22) that is disposed between the housing structure 60 and the bearing cap 362. Those of ordinary skill in the art will appreciate that the differential case 70 may be may be mounted to the axle housing 50 via the bearings 124 for rotation within the differential cavity 64 about the aforementioned rotational axis.

A retaining bore 128 can be formed through the first end segment 104 and a portion of the second side segment 102 and can intersect the through-bore 108. A first annular pocket 130 can be formed in the interior face of the first end segment 104 and can be concentric with the trunnion 120. The first annular pocket 130 can include a first bore portion 132 and a second bore portion 134 that can be concentric with and relatively smaller in diameter than the first bore portion 132.

The second end segment 106 can include an outer portion that defines a mounting hub 140 and an interior portion that defines a second annular pocket 142. The mounting hub 140 can be disposed between the flange 82 and the trunnion 120 and can include an actuator mount surface 150 that can be generally concentric with the trunnion 120. A circumferentially extending groove 152 can be formed in the actuator mount surface 150. A plurality of actuator apertures 154 can be formed axially through the second end segment 106 and can intersect the second annular pocket 142. The second annular pocket 142 can include a pocket portion 160, a plurality of locking features 162 and a thrust ring pocket 164. In the example provided, the pocket portion 160 is generally circular in shape and the locking features 162 can be recesses that can intersect the pocket portion 160. The locking features 162 can be shaped in any appropriate manner and in the example provided, have a half-circle shape that extends from the pocket portion 160. The thrust ring pocket 164 can be circular in shape and concentric with the pocket portion 160.

The gear set 74 can include first and second side gears 170 and 172, respectively, first and second pinion gears 174 and 176, respectively, a cross-shaft 178 and a retaining bolt 180. The first side gear 170 can include an annular gear portion 190, which can have a plurality of gear teeth, an annular hub portion 192, which can intersect the gear portion 190 at a flange face 194, and a splined aperture 196 that can engage a mating splined segment (not shown) formed on a corresponding one of the axle shafts 54. The hub portion 192 can be sized to be received in the second bore portion 134 in the first end segment 104, while a portion of the gear portion 190 can be received in the first bore portion 132. In the particular example provided, a thrust washer 200 is disposed over the hub portion 192 and abuts the flange face 194.

The second side gear 172 can include a gear portion 210, which can have a plurality of gear teeth, a tubular hub portion 212 and a splined aperture 216. The tubular hub portion 212 can axially extend from the second side gear 172 in a direction opposite the gear portion 210. The splined aperture 216 can be formed through the tubular hub portion 212 and can engage a mating splined segment (not shown) formed on a corresponding one of the axle shafts 54. The second side gear 172 can be received in the first pocket portion 160 of the second end segment 106. A thrust washer 220 can be disposed in the thrust ring pocket 164 between the interior surface 222 of the second end segment 106 and an axial end face 224 of the tubular hub portion 212. It will be appreciated that the thickness of the thrust washer 220 can be selected to control the lash between the teeth of the second side gear 172 and the teeth of the first and second pinion gears 174 and 176.

The first and second pinion gears 174 and 176 can be rotatably mounted on the cross-shaft 178 and meshingly engaged to the teeth of the first and second side gears 170 and 172. The cross-shaft 178 can extend through the through-bores 108 in the first and second side segments 100 and 102. Washer-like spacers 230 can be employed to control the lash between the first and second pinion gears 174 and 176 and the first and second side gears 170 and 172. The retaining bolt 180 can be inserted into the retaining bore 128 and threadably engaged to a mating threaded aperture 232 formed in the cross-shaft 178 to thereby fixedly secure cross-shaft 178 to the differential case 70.

The locking system 76 can include a first dog ring 240, a second dog ring 242, a return spring 244, a spacer ring 246, a thrust plate 248, an actuator assembly 250, a first retaining ring 252 and a second retaining ring 260.

Figure 5:
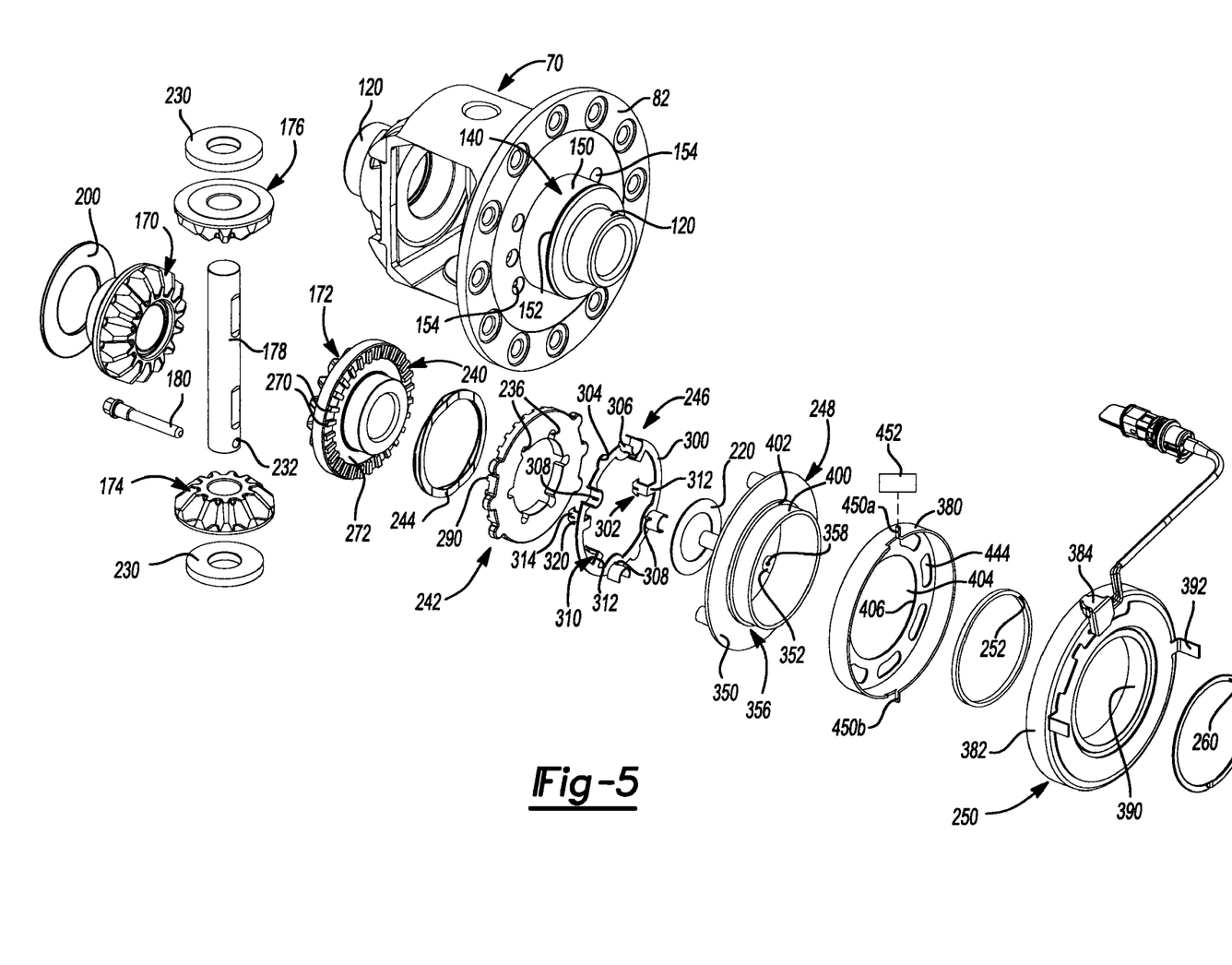
FIG. 5 is an exploded perspective view of a portion of the rear axle assembly, illustrating the differential assembly in more detail.

With reference to FIGS. 3 through 5, the first dog ring 240 can be coupled (e.g., integrally formed) with the second side gear 172 on a portion thereof opposite the gear portion 210. The first dog ring 240 can include a plurality of circumferentially spaced apart radially extending teeth 270 and a circular groove 272 that can be disposed between the tubular hub portion 212 and the teeth 270. In the example provided, the teeth 270 are relatively numerous and shallow so as to provide increased strength and load sharing between the teeth 270 as well as to lower tooth contact stresses.

The second dog ring 242 can include an annular body portion 280, a plurality of mating locking features 282, a circular groove 284 and a pilot portion 286. The annular body portion 280 can be received in the pocket portion 160 of the second annular pocket 142 and can include a plurality of teeth 290 that are configured to matingly engage the teeth 270 of the first dog ring 240. The circular groove 284 can be disposed radially inwardly of the teeth 290 and can generally correspond to the circular groove 272 formed in the first dog ring 240. The pilot portion 286 can be an annular axially projecting rim that can aid in retaining the return spring 244 to the second dog ring 242. Additionally or alternatively, the pilot portion 286 can engage a mating feature formed on the first dog ring 240 or the second side gear 172 that can guide or aid in guiding the teeth 290 of the second dog ring 242 into engagement with the teeth 270 of the first dog ring 240. The mating locking features 282 can be coupled to the annular body portion 280 and in the example provided, comprise tabs that are semi-circular in shape. The mating locking features 282 are configured to engage the locking features 162 in the second annular pocket 142 to permit the second dog ring 242 to be non-rotatably coupled to the differential case 70 but axially movable relative to the differential case 70 along the rotational axis of the differential case 70.

Figure 6:
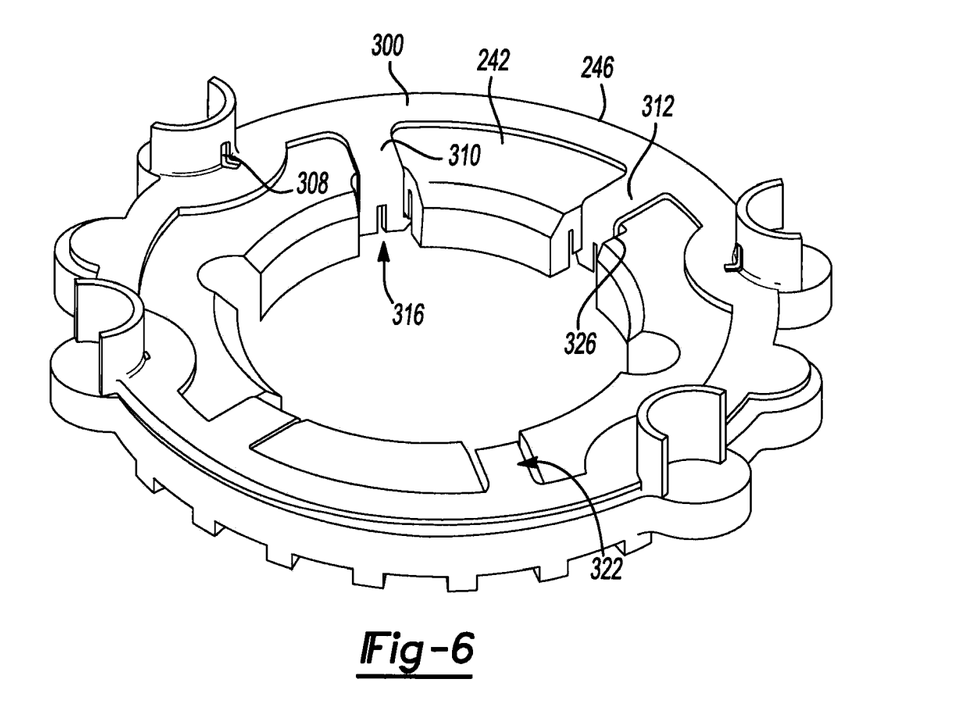
FIG. 6 is a perspective view of a portion of the rear axle assembly, illustrating a portion of the locking mechanism in more detail.

The spacer ring 246 can be unitarily formed from a suitable material, such as a polymer, which can be non-magnetic. The spacer ring 246 can include a spacer body 300 and means 302 for coupling the spacer body 300 to the second dog ring 242 and the thrust plate 248. The spacer body 300 can include a generally flat body portion 304 and a plurality of leg sleeves 306 that can be disposed about the body portion 304. The leg sleeves 306 can be shaped as a portion of a hollow cylinder and can define a retainer aperture 308. The coupling means 302 can be any appropriate means for fixedly or fixedly but removably coupling the spacer body 300 to the second dog ring 242. For example, the coupling means 302 can comprise adhesives, welds, rivets, threaded fasteners, pins, keys, etc. In the particular example provided, the coupling means 302 includes a plurality of fastening members 310 that extend from the body portion 304. Each fastening member 310 can include a leg portion 312, which can extend radially inwardly from the body portion 304, and an arm portion 314 that can be generally perpendicular to the leg portion 312. The arm portion 314 can include a barb structure 316 that can be configured to engage the second dog ring 242. In the particular example provided, the barb structure 316 includes a pair of tapered leading edges 318, a pair of abutting walls 320 and a central slit 322. When the body portion 304 of the spacer ring 246 is abutted against the second dog ring 242, the tapered leading edges 318 of the barb structures 316 contact the surface of locking apertures 326 that are formed in the second dog ring 242, causing the barb structures 316 to deflect inwardly. It will be appreciated that the locking apertures 326 can be chamfered to facilitate the deflection of the barb structures 316 as the barb structures 316 are being inserted to the locking apertures 326. When the barb structures 316 have passed through the second dog ring 242, the barb structures 316 can return to their normal shape to maintain the abutting walls 320 and the body portion 304 locked against opposite sides of the second dog ring 242 in a snap-fit manner as illustrated in FIG. 6. In the particular example shown, the abutting walls 320 of the barb structures 316 are tapered so as to draw the spacer ring 246 into abutment with the second dog ring 242 when the two are coupled together. Construction in this manner permits the two components to be abutted against one another despite dimensional variation in the fabrication of the second dog ring 242 and the spacer ring 246 to thereby minimize or eliminate end play between the two components. The spacer ring 246 can be disposed within the pocket portion 160 about the locking features 162 and can be positioned axially between the second dog ring 242 and the surface 160a of the pocket portion 160.

The return spring 244 can be any appropriate spring and can bias the first and second dog rings 240 and 242 apart from one another. In the example provided, the return spring 244 is a double wave spring that can be disposed in the circular grooves 272 and 284. It will be appreciated that the return spring 244 can bias the second dog ring 242 into abutment with the spacer ring 246 and the spacer ring 246 into abutment with the second end segment 106.

Figure 7:
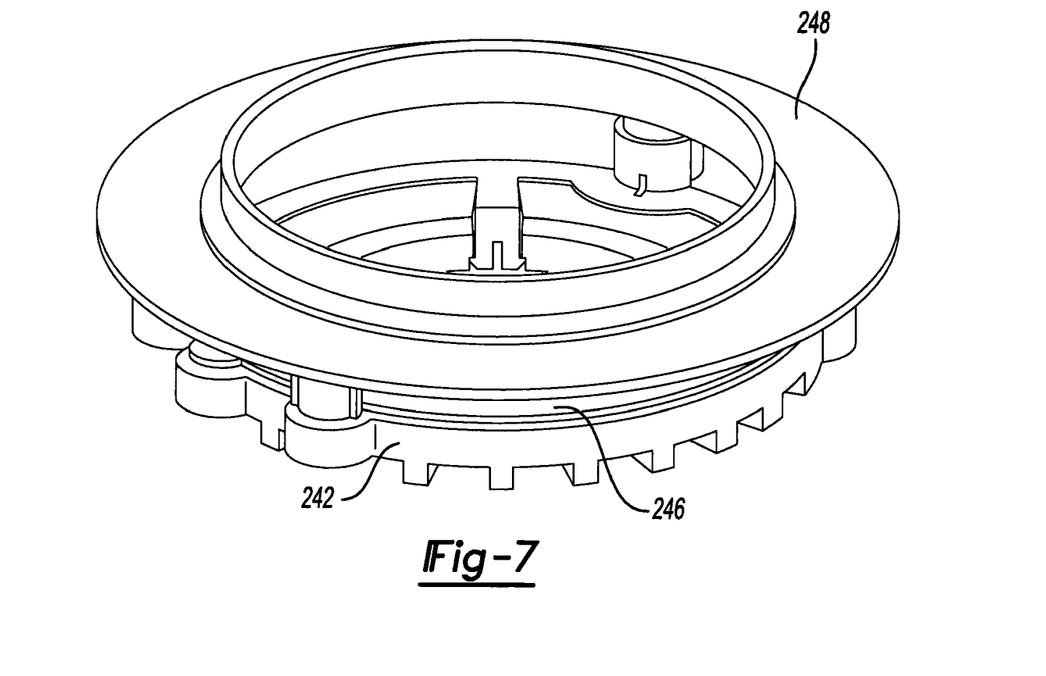
FIG. 7 is a perspective view of a portion of the rear axle assembly, illustrating a portion of the locking mechanism in more detail.

The thrust plate 248 can be unitarily formed of an appropriate material, such as a polymer. The thrust plate 248 can include a plate portion 350, a plurality of leg members 352, a means 354 for coupling the leg members 352 to either the second dog ring 242 or the spacer ring 246, and a means 356 for coupling the thrust plate 248 to the actuator 250. The plate portion 350 can have an annular shape and can be sized so as to be slidably received over the actuator mount surface 150. The leg members 352 can be coupled to the plate portion 350 and can extend axially through the actuator apertures 154 formed in the second end segment 106. The end of the leg members 352 opposite the plate portion 350 can engage the second dog ring 242 in an appropriate area. In the example provided, the thrust plate 248 include four leg members 352 each of which abutting a corresponding one of the mating locking features 282. The coupling means 354 can include any suitable means for fixedly or fixedly but removably coupling the thrust plate 248 to the spacer ring 246 or the second dog ring 242, including pins, rivets, threaded fasteners, adhesives, etc. In the particular example provided, the coupling means 354 includes locking tabs 358 that can be formed on the leg members 352 and configured to engage the retainer apertures 308 that are formed in the leg sleeves 306. In this example, the leg sleeves 306 extend through the actuator apertures 154 and abut the plate portion 350 when the locking tabs 358 are received in the retainer apertures 308 to thereby lock the second dog ring 242, the spacer ring 246 and the thrust plate 248 to one another as illustrated in FIG. 7.

The actuator assembly 250 can be generally similar to that which is described in copending U.S. patent application Ser. No. 11/507,311 filed Aug. 21, 2006 entitled "Electronically Actuated Apparatus Using Solenoid Actuator With Integrated Sensor", the disclosure of which is hereby incorporated by reference as if fully set forth in detail herein. Briefly, the actuator assembly 250 can be a linear actuator having a plunger 380, a solenoid 382 that can be selectively activated to move the plunger 380, one or more sensors 384 that can be employed to sense a position of the plunger 380 and responsively generate a sensor position signal, a bushing 390 and an anti-rotate bracket 392.

The bushing 390 can be formed of an appropriate material, such as an oil-impregnated sintered bronze conforming to ASTM B438. The bushing 390 can have an outer diameter, which can be sized to engage the solenoid 382 via an interference fit. The bushing 390 can define an inner diameter that is sized to be journally supported on the actuator mount surface 150 (FIG. 4) of the mounting hub 140 (FIG. 4) of the differential case 70 (FIG. 4). The anti-rotate bracket 392 can be formed of an appropriate material, such as a material having a low magnetic susceptibility (e.g., 316 stainless steel), and can be coupled to the solenoid 382 by an appropriate coupling means, such as fasteners (e.g., threaded fasteners, rivets), welds or adhesives. The anti-rotate bracket 392 can be configured to engage the opposite lateral surfaces of an associated one of the bearing caps 62 (FIG. 2) so as to inhibit relative rotation between the axle housing 50 (FIG. 2) and the actuator assembly 250.

Returning to FIGS. 3 through 5, the plunger 380 can be slidably received onto the mounting hub 140 and coupled to the thrust plate 248 via the coupling means 356. The coupling means 356 can comprise any appropriate for fixedly or fixedly but removably coupling the plunger 380 to the thrust plate 248. In the particular example provided, the coupling means 356 includes a hub portion 400, which extends from the plate portion 350 on a side opposite the leg members 352, and a retaining ring groove 402 that extends circumferentially about the hub portion 400. The hub portion 400 can be sided to be received into a central bore 404 that is formed in the plunger 380. The retaining ring groove 402 can be positioned on a side of the plunger 380 opposite its front face 406 and the first retaining ring 252 can be received in the retaining ring groove 402 to thereby couple the plunger 380 to the thrust plate 248. It will be appreciated that the plunger 380 is effectively coupled to the second dog ring 242 in the example provided such that movement of one of the plunger 380 and the second dog ring 242 will cause corresponding movement of the other one of the plunger 380 and the second dog ring 242.

The solenoid 382 can be slidably received onto the mounting hub 140 and abutted against the plunger 380. The second retaining ring 260 can be received in the circumferentially extending groove 152 in the actuator mount surface 150 and can inhibit axial withdrawal of the actuator assembly 250 from the mounting hub 140.

When the actuator assembly 250 is actuated, the plunger 380 will translate the thrust plate 248 such that the leg members 352 urge the second dog ring 242 toward the first dog ring 240 such that the teeth 270 and 290 of the first and second dog rings 240 and 242 engage one another. As the second dog ring 242 is non-rotatably coupled to the differential case 70 and as the first dog ring 240 is non-rotatably coupled to the second side gear 172, engagement of the teeth 270 and 290 inhibits rotation of the second side gear 172 relative to the differential case 70, thereby locking the differential assembly 38 (FIG. 2) to inhibit speed differentiation between the axle shafts 54 (FIG. 2). It will be appreciated that the anti-rotate bracket 392 can contact the sides of the adjacent bearing cap 62 (FIG. 2) to thereby inhibit or limit rotation of the actuator assembly 250 relative to the axle housing 50 (FIG. 2). It will be appreciated that as the actuator 250 is immersed in a fluid (i.e., a lubricating and cooling oil), apertures 444 in the plunger 380 can be sized and shaped to reduce surface tension and friction.

With specific reference to FIG. 5, the plunger 380 can include a pair of tab members 450a and 450b. A sensor target 452, which can be formed of a ferro-magnetic material, can be overmolded onto the tab member 450a. The tab member 450b can be received in a corresponding slot (not shown) in the solenoid 382; the slot and the tab member 450b can cooperate to inhibit relative rotation between the plunger 380 and the solenoid 382.

In the example provided, the sensor 384 includes a pair of digital Hall-effect sensors. A first one of the digital Hall-effect sensors can be programmed to output a first signal when the plunger 380 (and therefore the second dog ring 242) is in a position furthest from the first dog ring 240, and a second signal when the plunger 380 (and therefore the second dog ring 242) is in a position closest to the first dog ring 240. Similarly, the second one of the digital Hall-effect sensors can be programmed to output a third signal when the plunger 380 (and therefore the second dog ring 242) is in a position furthest from the first dog ring 240, and a fourth signal when the plunger 380 (and therefore the second dog ring 242) is in a position closest to the first dog ring 240. The first and fourth signals can have a first voltage and the second and third signals can have a second, different voltage. Construction in this manner provides a level of redundancy that provides for a robust design and the capability to more readily identify faults in the operation of the sensor 384.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. An axle assembly comprising:
    an axle housing;
    a pair of axle shafts; and
    a differential assembly with a differential case, a ring gear, an input pinion, a gear set and a locking device, the differential case being rotatably mounted within the axle housing, the differential case including a mounting hub and an annular pocket, the ring gear being coupled to the differential case for rotation therewith, the input pinion being rotatably mounted in the axle housing and meshingly engaged to the ring gear, the gear set including first and second side gears and a plurality of pinion gears, the first side gear being proximate a first end of the differential case and being coupled for rotation with a first one of the axle shafts, the second side gear being proximate a second end of the differential case opposite the first end, the second side gear being coupled for rotation with a second one of the axle shafts, the pinion gears meshingly engaging the first and second side gears, the locking device including a first dog, a second dog, a return spring, a thrust member, and an actuator, the first dog including a plurality of teeth and being non-rotatably coupled to the second side gear, the second dog including a plurality of mating teeth and being non-rotatably but axially slidably engaged to the differential case, the return spring biasing at least one of the first and second dogs in a direction so that the teeth and the mating teeth are not engaged to one another, the thrust member extending through the mounting hub, the actuator being mounted on the mounting hub and having a plunger, the actuator being operable in a returned position, which permits the return spring to maintain the teeth and the mating teeth in a de-coupled condition, and an extended position in which the actuator moves the plunger to push the thrust member and the second dog toward the first dog such that the teeth and the mating teeth engage one another to thereby inhibit relative rotation between the second side gear and the differential case;

wherein the plunger, the thrust member and the second dog are fixedly coupled to one another.

2. The axle assembly of claim 1, wherein the second side gear and the first dog are integrally formed.

3. The axle assembly of claim 1, wherein the thrust member includes an annular plate that is received on the mounting hub.

4. The axle assembly of claim 1, wherein the actuator includes a bracket that engages the axle housing to limit rotation of the actuator relative to the axle housing.

5. The axle assembly of claim 1, wherein the actuator includes a sensor that is configured to sense a position of the plunger and responsively generate at least one sensor signal.

6. The axle assembly of claim 1, wherein one of the thrust member and the plunger includes a hub portion having a circumferential groove formed thereon, and the other one of the thrust member and the plunger includes an bore into which the hub portion is received, and wherein the locking device includes a retaining member that is received in the circumferential groove to inhibit removal of the hub portion from the bore.

7. The axle assembly of claim 1, wherein the return spring is disposed between the first and second dogs.

8. The axle assembly of claim 7, wherein one of the first and second dogs includes a pilot portion onto which the return spring is received.

9. The axle assembly of claim 1, wherein the second dog includes an annular body portion and a plurality of locking features that extend from the annular body portion.

10. The axle assembly of claim 9, wherein the thrust member includes a plurality of leg members, each of the leg members extending through an associated actuator aperture formed in the mounting hub, each of the leg members engaging an associated one of the locking features.

11. The axle assembly of claim 10, wherein the locking device further includes a spacer, the spacer being coupled to at least one of the thrust member and the second dog.

12. The axle assembly of claim 11, wherein the spacer includes a plurality of barb structures for engaging one of the second dog and the thrust member.

13. The axle assembly of claim 12, wherein the one of the second dog and the thrust member includes a plurality of locking apertures for receiving the barb structures.

14. The axle assembly of claim 11, wherein one of the spacer and the thrust member includes a tab and the other one of the spacer and the thrust member includes a retainer aperture that is configured to receive the tab.

15. The axle assembly of claim 14, wherein the tabs are formed on the leg members.

16. The axle assembly of claim 15, wherein the spacer includes a leg sleeve that at least partially conforms to one of the leg members and wherein the retainer aperture is formed in the leg sleeve.

17. A method for assembling a locking differential comprising:
providing a differential case;
mounting a first dog ring in the differential case for rotation about an axis;
fixedly engaging a spacer to a second dog ring;
mounting the second dog ring with the spacer fixed thereto into the differential case, the second dog ring being non-rotatable and axially slidable relative to the differential case, the spacer being disposed between the differential case and the second dog ring;
mounting a thrust plate to the differential case, the thrust plate having a leg member;
fixedly engaging the thrust plate to at least one of the spacer and the second dog; and
mounting an actuator on the differential case, the actuator being extendable to push the thrust plate to drive the second dog ring into engagement with the first dog ring to thereby inhibit relative rotation between the first and second dog rings.

18. The method of claim 17, wherein the actuator includes a plunger and the method further includes coupling the plunger to the thrust plate such that the plunger, the thrust plate, the spacer and the second dog ring co-translate.

19. The method of claim 17, wherein the spacer is snap-fit to the second dog ring.

20. The method of claim 17, wherein the thrust plate is snap-fit to the spacer.

* * * * *